US012706250B2

(12) United States Patent
Park et al.

(10) Patent No.: US 12,706,250 B2
(45) Date of Patent: Aug. 11, 2026

(54) MULTILAYER ELECTRONIC COMPONENT

(71) Applicant: SAMSUNG ELECTRO-MECHANICS CO., LTD., Suwon-si (KR)

(72) Inventors: Sun Kyoung Park, Suwon-si (KR); Chae Dong Lee, Suwon-si (KR); Jung Wun Hwang, Suwon-si (KR); Wi Hun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 210 days.

(21) Appl. No.: 18/784,101

(22) Filed: Jul. 25, 2024

(65) Prior Publication Data

US 2025/0079087 A1 Mar. 6, 2025

(30) Foreign Application Priority Data

Sep. 6, 2023 (KR) ........................ 10-2023-0118092

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ............................... H01G 4/2325; H01G 4/30
See application file for complete search history.

(56) References Cited

U.S. PATENT DOCUMENTS

2018/0166215 A1* 6/2018 Hamanaka ............... H01G 4/12
2018/0174753 A1* 6/2018 Terashita ............... H01G 4/008
2019/0131076 A1* 5/2019 Fukumura .............. H01G 4/232
2021/0057162 A1* 2/2021 Yamamoto ............. H01G 4/008
2021/0090803 A1 3/2021 Kang et al.
2021/0098193 A1* 4/2021 Mishima ................ H01G 2/065
2022/0139618 A1 5/2022 Kang et al.
2022/0223348 A1* 7/2022 Oh ......................... H01G 4/232
2023/0113834 A1* 4/2023 Park ..................... H01G 4/1227
361/306.3
2023/0215643 A1 7/2023 Lee et al.

FOREIGN PATENT DOCUMENTS

JP 2018-098475 A 6/2018
KR 10-2019-0116177 A 10/2019

OTHER PUBLICATIONS

Extended European Search Report dated Feb. 10, 2025 issued in corresponding European Patent Application No. 24192622.9.

* cited by examiner

*Primary Examiner* — Michael P Mcfadden
(74) *Attorney, Agent, or Firm* — MORGAN, LEWIS & BOCKIUS LLP

(57) ABSTRACT

A multilayer electronic component according to an example embodiment may include: a body including dielectric layers and internal electrodes; and an external electrode including a connection portion, and a band portion extending from the connection portion, wherein the external electrode may include an electrode layer connected to the internal electrode and including a first conductive metal and glass, a conductive resin layer disposed on the electrode layer and including a second conductive metal and a resin, and a silver (Ag) coating layer disposed between an electrode layer and a conductive resin layer of the band portion, and an average thickness of the silver (Ag) coating layer may be 2 μm or more and 5 μm or less.

19 Claims, 6 Drawing Sheets

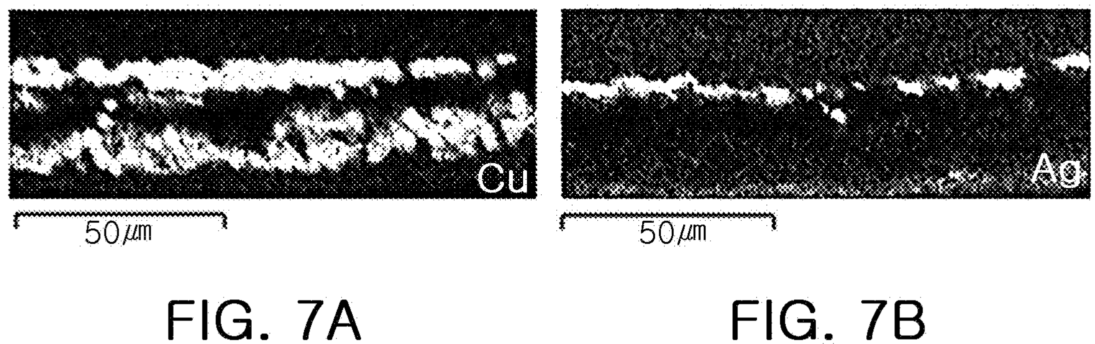
FIG. 7A
FIG. 7B
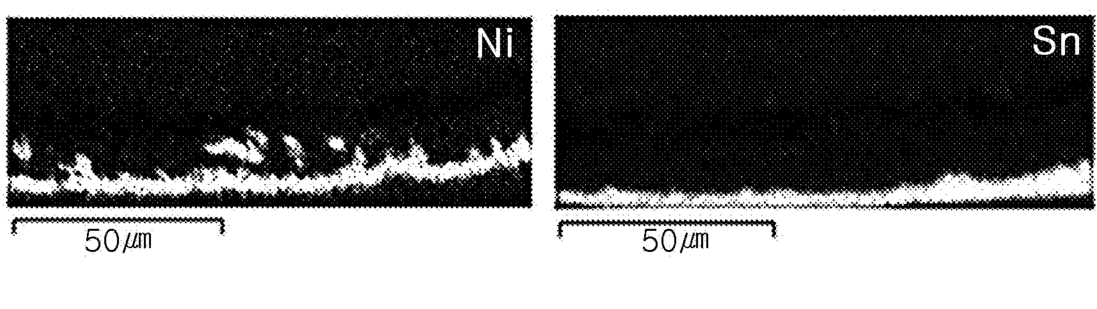
FIG. 7C
FIG. 7D

MULTILAYER ELECTRONIC COMPONENT

CROSS-REFERENCE TO RELATED APPLICATION(S)

This application claims benefit of priority to Korean Patent Application No. 10-2023-0118092 filed on Sep. 6, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser that is mounted on the printed circuit boards of various types of electronic product, such as image display devices including a liquid crystal display (LCD) and a plasma display panel (PDP), computers, smartphones and mobile phones, and serves to charge or discharge electricity therein or therefrom.

The multilayer ceramic capacitor may be used as a component in various electronic devices due to having a small size, ensuring high capacitance and being easily mounted, and with the miniaturization and high output power of various electronic devices such as computers and mobile devices, demand for miniaturization and high capacitance of multilayer ceramic capacitors has also been increasing.

However, a ceramic body has the property of being destroyed without a plastic deformation zone when an external impact is applied, and in order to prevent warpage cracks, there is a need for a structure that may absorb or relieve tensile stress transmitted to the ceramic body.

Accordingly, a method of suppressing external warpage stress from being transmitted to the ceramic body is applied by applying a resin-based electrode to which a resin is added, to an external electrode structure, but in order to further improve warpage strength, research is being conducted on various types of structural design and modification and materials.

SUMMARY

An aspect of the present disclosure is to provide a multilayer electronic component having improved warpage stress.

An aspect of the present disclosure is to suppress an occurrence of warpage cracks in a multilayer electronic component by causing peel-off in external electrodes when warpage stress is applied from the outside.

However, the aspects of the present disclosure are not limited to the above-described contents, and may be more easily understood in the process of describing specific embodiments of the present disclosure.

According to an aspect of the present disclosure, a multilayer electronic component may include: a body including a dielectric layer, and internal electrodes alternately disposed with the dielectric layer in a first direction, the body including first and second surfaces opposing each other in the first direction, third and fourth surfaces opposing each other in a second direction and connected to the first and second surfaces, and fifth and sixth surfaces opposing each other in a third direction and connected to the first to fourth surfaces; and an external electrode including a connection portion disposed on the third and fourth surfaces, and a band portion extending from the connection portion to a portion of the first and second surfaces, wherein the external electrode may include an electrode layer connected to the internal electrodes and including a first conductive metal and glass, a conductive resin layer disposed on the electrode layer and including a second conductive metal and a resin, and a silver (Ag) coating layer disposed in the band portion and between the electrode layer and the conductive resin layer, and an average thickness of the silver (Ag) coating layer may be 2 μm or more and 5 μm or less.

According to an aspect of the present disclosure, a multilayer electronic component may include: a body including a dielectric layer, and internal electrodes alternately disposed with the dielectric layer in a first direction, the body including first and second surfaces opposing each other in the first direction, third and fourth surfaces opposing each other in a second direction and connected to the first and second surfaces, and fifth and sixth surfaces opposing each other in a third direction and connected to the first to fourth surfaces; and an external electrode including a connection portion disposed on the third and fourth surfaces, and a band portion extending from the connection portion to a portion of the first and second surfaces, wherein the external electrode may include an electrode layer connected to the internal electrodes and including a first conductive metal and glass, a conductive resin layer disposed on the electrode layer and including a second conductive metal and a resin, and a silver (Ag) coating layer disposed in the band portion and between the electrode layer and the conductive resin layer, and the silver (Ag) coating layer may have an average atomic percentage of silver (Ag) of 90 at % or more.

One of the various effects of the present disclosure is to improve warpage stress of a multilayer electronic component.

One of the various effects of the present disclosure is to suppress an occurrence of warpage cracks in a multilayer electronic component by causing peel-off in external electrodes when warpage stress is applied from the outside.

Advantages and effects of the present application are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which:

FIGS. 7A to 7D are elemental maps of copper (Cu), silver (Ag), nickel (Ni), and tin (Sn), respectively, included in one region of FIG. 6 analyzed in an EDS mode.

DETAILED DESCRIPTION

Figure 1:
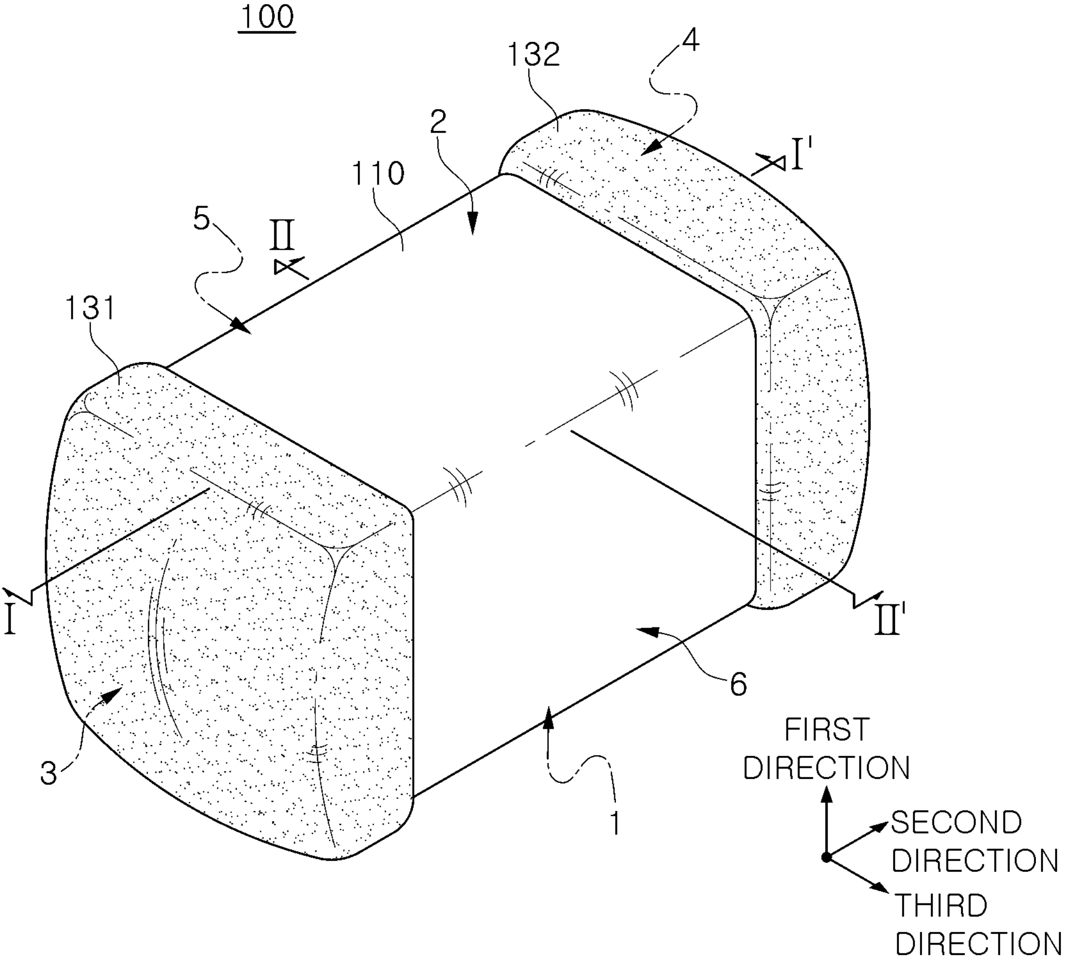
FIG. 1 is a perspective view schematically illustrating a multilayer electronic component according to an example embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an example embodiment of the present disclosure.

Figure 2:
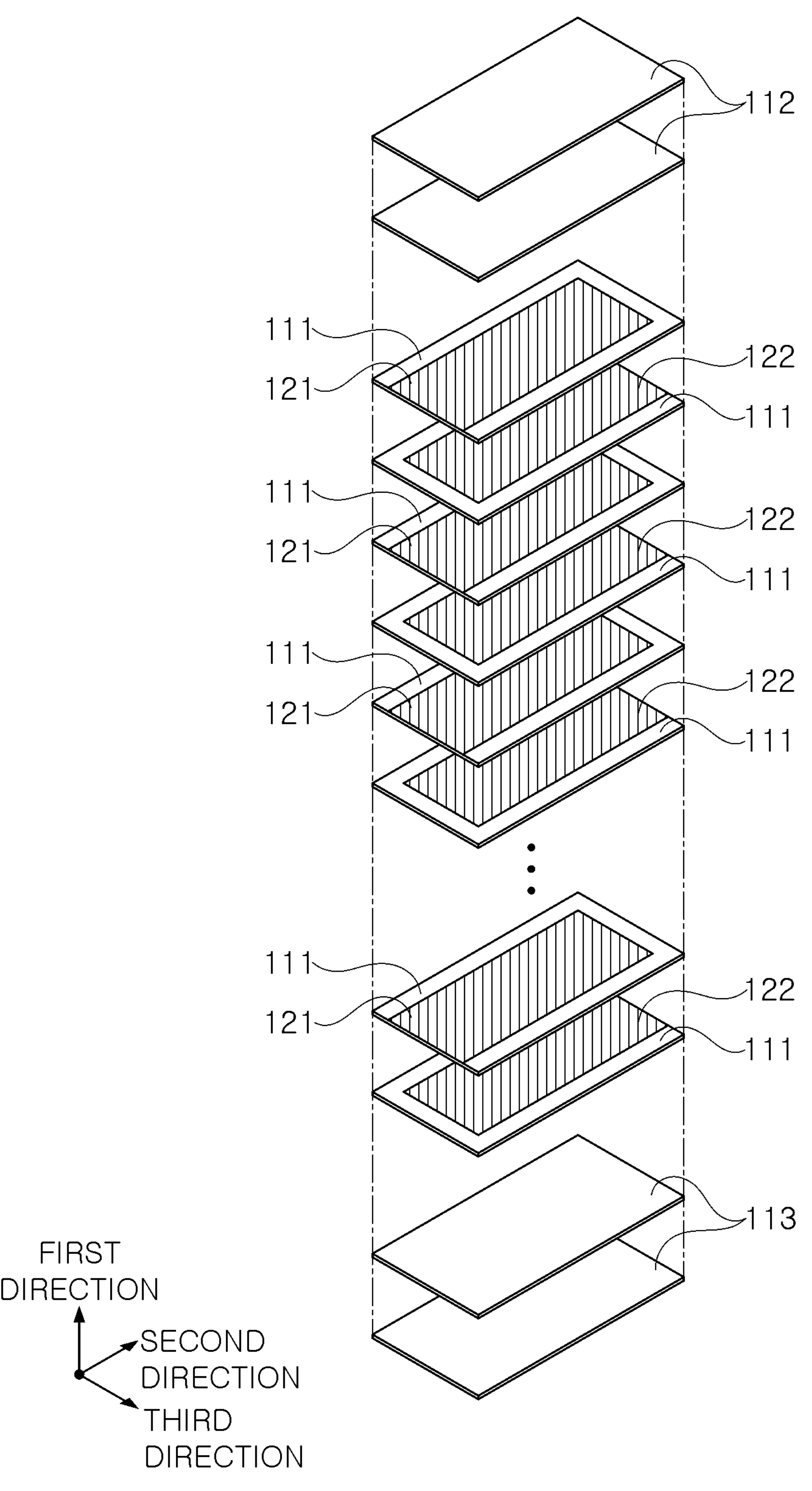
FIG. 2 schematically illustrates an exploded perspective view illustrating a stacked structure of internal electrodes.
Figure 3:
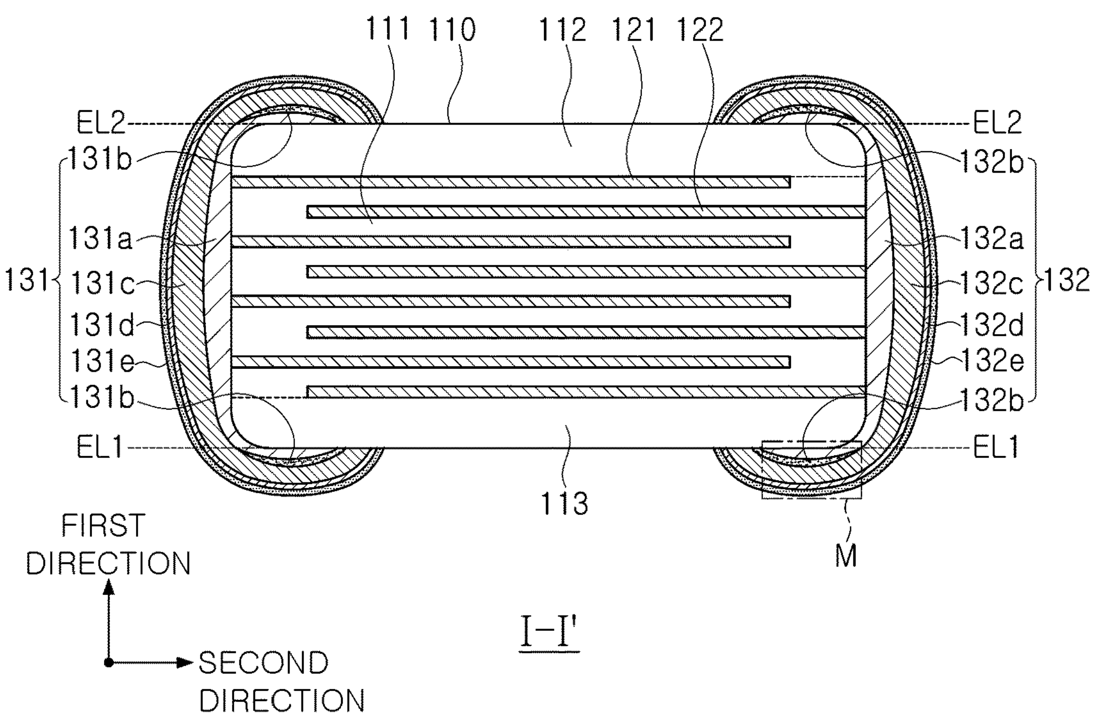
FIG. 3 schematically illustrates a cross-sectional view taken along line I-I' in FIG. 1.

FIG. 2 schematically illustrates an exploded perspective view illustrating a stacked structure of internal electrodes;

FIG. 3 schematically illustrates a cross-sectional view taken along line I-I' in FIG. 1.

Figure 4:
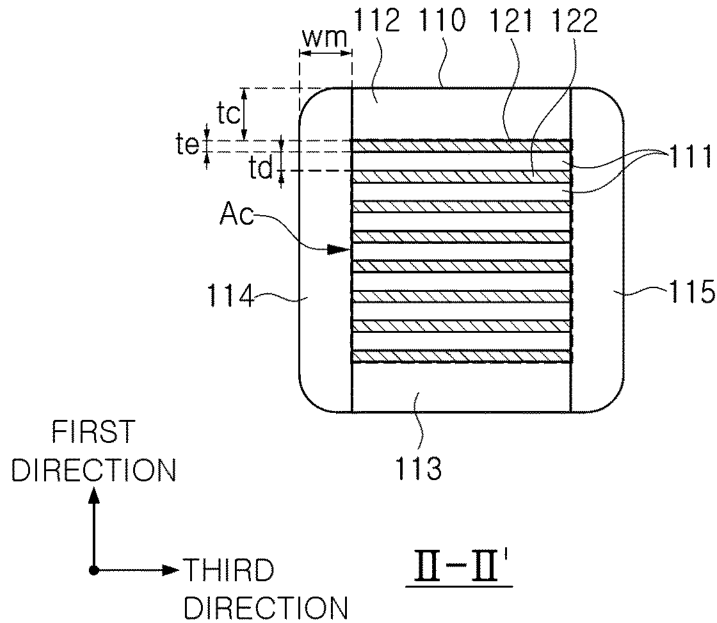
FIG. 4 schematically illustrates a cross-sectional view taken along line II-II' in FIG. 1.

FIG. 4 schematically illustrates a cross-sectional view taken along line II-II' in FIG. 1.

Figure 5:
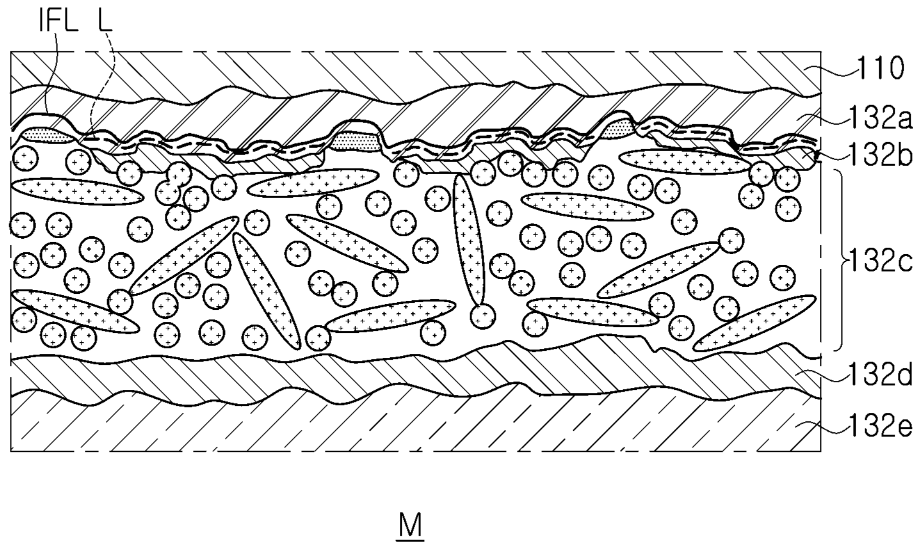
FIG. 5 schematically illustrates an enlarged view of region M in FIG. 3.

FIG. 5 schematically illustrates an enlarged view of region M in FIG. 3.

Hereinafter, a multilayer electronic component according to an example embodiment of the present disclosure will be described in detail with reference to FIGS. 1 to 5. However, as an example of a multilayer electronic component, a multilayer ceramic capacitor will be described, but the present disclosure is not limited thereto, and the present disclosure may also be applied to various electronic products using dielectric compositions, such as an inductor, a piezoelectric element, a varistor, or a thermistor.

A multilayer electronic component 100 according to an example embodiment of the present disclosure may include a body including a dielectric layer 111 and internal electrodes 121 and 122 alternately disposed with the dielectric layer 111 in a first direction, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in a third direction; and external electrodes 131 and 132 including a connection portion disposed on the third and fourth surfaces 3 and 4, and a band portion extending from the connection portion to a portion of the first and second surfaces 1 and 2, and the external electrodes 131 and 132 may include electrode layers 131*a* and 132*a* connected to the internal electrodes 121 and 122 and including a first conductive metal and glass, conductive resin layers 131*c* and 132*c* disposed on the electrode layers 131*a* and 132*a* and including a second conductive metal and a resin, and silver (Ag) coating layers 131*b* and 132*b* disposed between an electrode layer and a conductive resin layer of the band portion, and an average thickness of the silver (Ag) coating layers 131*b* and 132*b* may be 2 μm or more and 5 μm or less.

The body 110 may have the dielectric layer 111 and the internal electrodes 121 and 122 alternately stacked.

More specifically, the body 110 may include a capacitance formation portion (Ac) that forms capacitance by including a first internal electrode 121 and a second internal electrode 122 disposed in the body 110 and alternately arranged to face each other with the dielectric layer 111 interposed therebetween.

There is no particular limitation on a specific shape of the body 110, but as illustrated, the body 110 may have a hexahedral shape or a shape similar thereto. Due to contraction of ceramic powder particles included in the body 110 during a sintering process, the body 110 may not have a hexahedral shape with a complete straight line, but may have a substantially hexahedral shape The body 110 may have first and second surface 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in the third direction.

In a state in which a plurality of dielectric layers 111 forming the body 110 are sintered, boundaries between adjacent dielectric layers 111 may be so integrated so as to be difficult to identify without using a scanning electron microscope (SEM).

A raw material forming the dielectric layer 111 is not limited as long as sufficient electrostatic capacity may be obtained. In general, perovskite ($ABO_3$)-based materials may be used, for example, a barium titanate-based material, a lead composite perovskite-based material, or a strontium titanate-based material may be used. The barium titanate-based material may include $BaTiO_3$-based ceramic particles. Examples of the ceramic particles include $BaTiO_3$, and $(Ba_{1-x}Ca_x)TiO_3$ ($0<x<1$), $Ba(Ti_{1-y}Ca_y)O_3$ ($0<y<1$), $(Ba_{1-x}C_{ax})(Ti_{1-y}Zr_y)O_3$ ($0<x<1$, $0<y<1$) or $Ba(Ti_{1-y}Zr_y)O_3$ ($0<y<1$) which is formed by partially employing calcium (Ca) and zirconium (Zr) in $BaTiO_3$.

Additionally, the raw material forming the dielectric layer 111 may be obtained by adding various ceramic additives, organic solvents, binders, dispersants, and the like, to particles such as barium titanate ($BaTio_3$) according to the purpose of the present disclosure.

A thickness (td) of the dielectric layer 111 is not particularly limited.

However, in order to achieve high capacitance of a multilayer electronic component, the thickness of the dielectric layer 111 may be 3.0 μm or less, and in order to more easily achieve miniaturization and high capacitance of the multilayer electronic component, the thickness of the dielectric layer 111 may be 1.0 μm or less, preferably 0.6 μm or less, and more preferably 0.4 μm or less.

Here, the thickness (td) of the dielectric layer 111 may refer to a thickness (td) of the dielectric layer 111 disposed between the first and second internal electrodes 121 and 122.

Meanwhile, the thickness (td) of the dielectric layer 111 may refer to a size of the dielectric layer 111 in the first direction. Additionally, the thickness (td) of the dielectric layer 111 may refer to an average thickness (td) of the dielectric layer 111, and may refer to an average size of the dielectric layer 111 in the first direction.

The average thickness of the dielectric layer 111 may be measured by scanning images of first and second directional cross-sections of the body 110 with a scanning electron microscope (SEM) of 10,000× magnification. More specifically, an average size of one dielectric layer 111 in the first direction may refer to an average value calculated by measuring a first directional size of one dielectric layer 111 in the scanned images at 30 areas which are spaced apart from each other at equal intervals in the second direction. The 30 areas spaced apart from each other at the equal intervals may be designated in a capacitance formation portion Ac described below. Additionally, when the average value is measured by extending an average value measurement up to 10 dielectric layers 111, an average size of the dielectric layers 111 in the first direction may be further generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately arranged to face each other with the dielectric layer 111 forming the body 110 interposed therebetween, and may be disposed on the third and fourth surfaces 3 and 4 of the body, respectively. Here, 'being exposed to one surface of the body' may denote being in contact with one surface of the body.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body 110 and connected to the first internal electrode 121, and a second external electrode 132 may be disposed on the fourth surface 4 of the body 110 and connected to the second internal electrode 122.

That is, the first internal electrode 121 may be connected to the first external electrode 131 without being the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed in the middle.

Meanwhile, the body 110 may be formed by alternately stacking a ceramic green sheet on which the first internal electrode 121 is printed and a ceramic green sheet on which the second internal electrode 122 is printed, and then sintering the ceramic green sheets.

A material forming the internal electrodes 121 and 122 is not particularly limited, and any material with excellent electrical conductivity may be used. For example, the internal electrodes 121 and 122 may include one or more of nickel (Ni), copper (Cu), palladium (Pd), silver (Ag), gold (Au), platinum (Pt), tin (Sn), and tungsten (W), titanium (Ti), and alloys thereof.

Additionally, the internal electrodes 121 and 122 may be formed by printing, on a ceramic green sheet, a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof. The printing method for the conductive paste for internal electrodes may be a screen printing method or a gravure printing method, but the present disclosure is not limited thereto.

Meanwhile, the thickness (te) of the internal electrodes 121 and 122 is not particularly limited.

However, in order to achieve high capacitance of a multilayer electronic component, the thickness of the internal electrodes 121 and 122 may be 1.5 μm or less, or 1.0 μm or less, and in order to more easily achieve miniaturization and high capacitance of the multilayer electronic component, the thickness of the internal electrodes 121 and 122 may be 0.6 μm or less, and more preferably 0.4 μm or less.

Here, the thickness (te) of the internal electrodes 121 and 122 may refer to a size of the internal electrodes 121 and 122 in the first direction. Additionally, the thickness (te) of the internal electrodes 121 and 122 may refer to an average thickness (te) of the internal electrodes 121 and 122, and may refer to an average size of the internal electrodes 121 and 122 in the first direction.

The average size of the internal electrodes 121 and 122 in the first direction may be measured by scanning images of the first and second directional cross-sections of the body 110 with a scanning electron microscope (SEM) of 10,000× magnification. More specifically, an average size of one internal electrode in the first direction may refer to an average value calculated by measuring a first directional size of one internal electrode in the scanned images at 30 areas which are spaced apart from each other at equal intervals in the second direction. The 30 areas spaced apart from each other at the equal intervals may be designated in the capacitance formation portion Ac. Additionally, when the average value is measured by extending an average value measurement up to 10 internal electrodes, an average size of the internal electrode in the first direction may be further generalized.

Meanwhile, in an example embodiment of the present disclosure, an average thickness (td) of at least one of the plurality of dielectric layers 111 and an average thickness (te) of at least one of the plurality of internal electrodes 121 and 122 may satisfy 2×te<td.

In other words, the average thickness (td) of one dielectric layer 111 may be greater than twice the average thickness (te) of one internal electrode 121 or 122. Preferably, the average thickness (td) of the plurality of dielectric layers 111 may be greater than twice the average thickness (te) of the plurality of internal electrodes 121 and 122.

In general, for high-voltage electronic components, a major issue is reliability due to a decrease in breakdown voltage (BDV) in a high-voltage environment.

Accordingly, in order to prevent a decrease in the breakdown voltage (BDV) in the high voltage environment, the average thickness (td) of the dielectric layer 111 may be made greater than twice the average thickness (te) of the internal electrodes 121 and 122, thereby increasing a thickness of the dielectric layer, which is a distance between internal electrodes, as well as improving the breakdown voltage characteristics.

When the average thickness (td) of the dielectric layer 111 is less than twice the average thickness (te) of the internal electrodes 121 and 122, the average thickness of the dielectric layer, which is the distance between internal electrodes, may be thin, which may decrease the breakdown voltage and cause a short circuit between the internal electrodes.

In high-voltage electronic components, the average thickness (te) of the internal electrodes may be 1 μm or less, and the average thickness (td) of the dielectric layer may be 3.0 μm or less, but the present disclosure is not necessarily limited thereto.

Meanwhile, the body 110 may include cover portions 112 and 113 disposed on both end-surfaces of the capacitance formation portion Ac in the first direction.

More specifically, the body 110 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by stacking a single dielectric layer 111 or two or more dielectric layers 111 on upper and lower surfaces of the capacitance formation portion Ac in the first direction, respectively, and may basically serve to prevent damage to the internal electrodes 121 and 122 due to physical or chemical stress.

The upper cover portion 112 and the lower cover portion 113 do not include the internal electrodes 121 and 122, and may include the same material as the dielectric layer 111. That is, the upper cover portion 112 and the lower cover portion 113 may include a ceramic material, for example, a barium titanate ($BaTiO_3$)-based ceramic material.

Meanwhile, a thickness (tc) of the cover portions 112 and 113 is not particularly limited.

However, in order to more easily achieve miniaturization and high capacitance of the multilayer electronic component, the thickness (tc) of the cover portions 112 and 113 may be 100 μm or less, preferably 30 μm or less, and more preferably 20 μm or less in ultra-small products.

Here, the thickness (tc) of the cover portions 112 and 113 may refer to a size of the cover portions 112 and 113 in the first direction. Additionally, the thickness (tc) of the cover portions 112 and 113 may refer to an average thickness (tc) of the cover portions 112 and 113, and may mean an average size of the cover portions 112 and 113 in the first direction.

The average size of the cover portions 112 and 113 in the first direction may be measured by scanning images of the first and second directional cross-sections of the body 110 with a scanning electron microscope (SEM) of 10,000× magnification. More specifically, the average size thereof may refer to an average value calculated by measuring the size of one cover portion in the first direction in the scanned images at 30 areas spaced apart from each other at equal intervals in the second direction.

Additionally, the average size of the cover portion in the first direction measured by the above-described method may be substantially the same as the average size of the cover portion in the first direction, in the first and third directional cross-sections of the body 110.

Meanwhile, the multilayer electronic component 100 may include side margin portions 114 and 115 disposed on both end-surfaces of the body 110 in the third direction.

More specifically, the side margin portions 114 and 115 may include a first side margin portion 114 disposed on the fifth surface 5 of the body 110, and a second side margin portion 115 disposed on the sixth surface 6 of the body 110.

As illustrated, the side margin portions 114 and 115 may refer to a region between both end-surfaces of the first and second internal electrodes 121 and 122 in the third direction and a boundary surface of the body 110, based on the first and third directional cross-sections of the body 110.

The side margin portions 114 and 115 may be formed by applying a conductive paste except for an area in which the side margin portions 114 and 115 are to be formed on the ceramic green sheet applied to the capacitance formation portion Ac, thus forming the internal electrodes 121 and 122, and in order to suppress a step portion caused by the internal electrodes 121 and 122, after cutting the stacked internal electrodes 121 and 122 to expose the fifth and sixth surfaces 5 and 6 of the body 110, a single dielectric layer 111 or two or more dielectric layers 111 may be stacked and formed in the third direction on both end-surfaces of the capacitance formation portion Ac in the third direction.

The side margin portions 114 and 115 may basically serve to prevent damage to the internal electrodes 121 and 122 due to physical or chemical stress.

The first side margin portion 114 and the second side margin portion 115 do not include the internal electrodes 121 and 122, and may include the same material as dielectric layer 111. That is, the first side margin portion 114 and the second side margin portion 115 may include a ceramic material, for example, a barium titanate ($BaTiO_3$)-based ceramic material.

Meanwhile, a width (wm) of the first and second side margin portions 114 and 115 is not particularly limited.

However, in order to more easily achieve miniaturization and high capacitance of the multilayer electronic component 100, the width (wm) of the side margin portions 114 and 115 may be 100 μm or less, preferably 30 μm or less, and more preferably 20 μm or less in ultra-small products.

Here, the width (wm) of the side margin portions 114 and 115 may refer to a size of the side margin portions 114 and 115 in the third direction. Additionally, the width (wm) of the side margin portions 114 and 115 may refer to an average width (wm) of the side margin portions 114 and 115, and may refer to an average size of the side margin portions 114 and 115 in the third direction.

An average size of the side margin portions 114 and 115 in the third direction may be measured by scanning images of the first and third directional cross-sections of the body 110 with a scanning electron microscope (SEM) of 10,000× magnification. More specifically, the average size thereof may refer to an average value calculated by measuring a third directional size of one side margin portion in the scanned images at 10 areas which are spaced apart from each other at equal intervals in the first direction.

In an example embodiment of the present disclosure, a structure in which the ceramic electronic component 100 has two external electrodes 131 and 132 is described, but the number or shape of the external electrodes 131 and 132 may be changed depending on the shape of the internal electrodes 121 and 122 or other purposes.

The external electrodes 131 and 132 may be disposed on the body 110 and may be connected to the internal electrodes 121 and 122.

More specifically, the external electrodes 131 and 132 may include first and second external electrodes 131 and 132 disposed on the third and fourth surfaces 3 and 4 of the body 110, respectively, and connected to the first and second internal electrodes 121 and 122, respectively. That is, the first external electrode 131 may be disposed on the third surface 3 of the body and connected to the first internal electrode 121, and the second external electrode 132 may be disposed on the fourth surface 4 of the body and connected to the second internal electrode 122.

Additionally, the external electrodes 131 and 132 may be disposed to extend on a portion of the first and second surfaces 1 and 2 of the body 110, or may be disposed to extend on a portion of the fifth and sixth surfaces 5 and 6 of the body 110. That is, the first external electrode 131 may be disposed on a portion of the first, second, fifth, and sixth surfaces 1, 2, 5 and 6 of the body 110, and on the third surface 3 of the body 110, and the second external electrode 132 may be disposed on a portion of the first, second, fifth, and sixth surfaces 1, 2, 5 and 6 of the body 110, and on the third surface 3 of the body 110.

Specifically, the external electrodes 131 and 132 may include a connection portion disposed on the third and fourth surfaces 3 and 4, and a band portion extending from the connection portion to a portion of the first and second surfaces 1 and 2.

The first external electrode 131 may include a first connection portion disposed on the third surface 3, a first band portion extending from the first connection portion to a portion of the first surface 1, and a third band portion extending from the first connection portion to a portion of the second surface 2. The second external electrode 132 may include a second connection portion disposed on the fourth surface 4, a second band portion extending from the second connection portion to a portion of the first surface 1, and a fourth band portion extending from the second connection portion to a portion of the second surface 2.

Referring to FIG. 3, in the present disclosure, the "connection portion" may refer to a portion disposed between an extension line EL1 on the first surface of the external electrode and an extension line EL2 on the second surface thereof, and the "band portion" may refer to a portion disposed below the extension line EL1 of the first surface of the external electrode in the first direction and a portion disposed above the extension line EL2 of the second surface thereof in the first direction.

Meanwhile, the external electrodes 131 and 132 may be formed using any material as long as they have electrical conductivity, such as metal, and a specific material thereof may be determined in consideration of electrical properties, structural stability, and the like, and the external electrodes 131 and 132 may further have a multilayer structure.

For example, the external electrodes 131 and 132 may include electrode layers 131*a* and 132*a* disposed in contact with the body 110 and conductive resin layers 131*c* and 132*c* disposed on the electrode layers 131*a* and 132*a*. For example, the electrode layers 131*a* and 132*a* and the conductive resin layers 131*c* and 132*c* may be formed by transferring a sheet including a conductive metal onto the body or by applying/dipping a paste.

More specifically, the electrode layers 131*a* and 132*a* may be sintered electrodes including a first conductive metal and glass, and the conductive resin layers 131*c* and 132*c* may be resin-based electrodes including a second conductive metal and a resin.

That is, the conductive metal included in the first electrode layers 131*a* and 132*a* may be referred to as a first conductive metal, and the conductive metal included in the conductive resin layers 131*c* and 132*c* may be referred to as a second conductive metal.

The conductive metal may include one or more selected from the group consisting of nickel (Ni), copper (Cu), palladium (Pd), silver (Ag), gold (Au), platinum (Pt), tin (Sn), tungsten (W), titanium (Ti) and alloys thereof, but the present disclosure is not particularly limited thereto. That is, there may be one or more types of conductive metal.

More specifically, the electrode layers 131*a* and 132*a* serve to improve adhesion to the body 110 by including glass, and the conductive resin layers 131*c* and 132*c* may serve to improve warpage strength by including a resin.

The first conductive metal used in the electrode layers 131*a* and 132*a* is not particularly limited as long as any material may be electrically connected to the internal electrodes 121 and 122 to form electrostatic capacity, and the first conductive metal may include, for example, one or more selected from the group consisting of nickel (Ni), copper (Cu), palladium (Pd), silver (Ag), gold (Au), platinum (Pt), tin (Sn), tungsten (W), titanium (Ti) and alloys thereof. The first electrode layers 131*a* and 132*a* may be formed by applying a conductive paste prepared by adding a glass frit to the conductive metal particles and then sintering the conductive paste.

The second conductive metal included in the conductive resin layers 131*c* and 132*c* may serve to electrically connect the electrode layers 131*a* and 132*a*.

The second conductive metal included in the conductive resin layers 131*c* and 132*c* is not particularly limited as long as any material may be electrically connected to the electrode layers 131*a* and 132*a*, and the second conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof.

In this case, the first and second conductive metals may be the same, and for example, the first and second conductive metals may be copper (Cu). However, the present disclosure is not particularly limited thereto, and the first and second conductive metals may be different from each other. Additionally, when the first and second conductive metals are plural, the same metal or different metals may be included between the first and second conductive metals.

The second conductive metal included in the conductive resin layers 131*c* and 132*c* may include one or more of flake-shaped particles and spherical particles. That is, the conductive metal may be formed only of flake-shaped particles, or only of spherical particles, or may be a mixture of flake-shaped particles and spherical particles. Here, the spherical particles may also include shapes that are not completely spherical, and may include, for example, a form in which a length ratio (major axis/minor axis) of the major axis and the minor axis is 1.45 or less. The flake-type particles may refer to particles having a flat and elongated shape, and are not particularly limited thereto, but for example, the length ratio (major axis/minor axis) of the major axis and the minor axis may be 1.95 or more.

The lengths of the major and minor axes of the spherical particles and the flake-shaped particles may be measured from an image obtained by scanning the first and second directional cross-sections cut in the center of the ceramic electronic component in the third direction with a scanning electron microscope (SEM).

The resin included in the conductive resin layers 131*c* and 132*c* may ensure bonding properties and serve as shock absorbers. The resin included in the conductive resin layers 131*c* and 132*c* is not particularly limited as long as the resin may have bonding properties and shock absorption properties and may be mixed with conductive metal particles to make a paste, and the resin may include, for example, an epoxy-based resin.

Additionally, the conductive resin layers 131*c* and 132*c* may include a plurality of metal particles, an intermetallic compound, and a resin. By including the intermetallic compound, electrical connectivity with the electrode layers 131*a* and 132*a* may be further improved. The intermetallic compound may serve to improve electrical connectivity by connecting the plurality of metal particles, and may serve to surround and connect the plurality of metal particles to each other.

In this case, the intermetallic compound may include a metal having a melting point lower than a curing temperature of the resin. That is, because the intermetallic compound includes the metal having a melting point lower than the curing temperature of the resin, the metal having a melting point lower than the curing temperature of the resin is melted during the drying and curing process and forms an intermetallic compound with some of the metal particles to surround the metal particles. In this case, the intermetallic compound may include, preferably, a metal having a low melting point of 300° C. or lower.

For example, the intermetallic compound may include Sn having a melting point of 213° C. to 220° C. Sn is melted during the drying and hardening process, and the melted Sn wets high melting point metal particles such as Ag, Ni or Cu through capillary action, and reacts with some of Ag, Ni, or Cu metal particles to form intermetallic compounds such as $Ag_3Sn$, $Ni_3Sn_4$, $Cu_6Sn_5$, and $Cu_3Sn$. Ag, Ni or Cu that did not participate in the reaction remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$ and $Cu_3Sn$.

Meanwhile, a multilayer ceramic capacitor may be used as components in various electronic devices due to having small size, ensuring high capacitance and being easily mounted. With the miniaturization and high output power of various electronic devices such as computers and mobile devices, demand for miniaturization and high capacitance of multilayer ceramic capacitors has also been increasing.

However, a ceramic body has the property of being destroyed without a plastic deformation zone when an external impact is applied, and in order to prevent warpage cracks, there is a need for a structure that may absorb or relieve tensile stress transmitted to the ceramic body.

Accordingly, as described above, a method of suppressing external warpage stress from being transmitted to the ceramic body is applied by applying a resin-based electrode to which a resin is added, to an external electrode structure, but in order to further improve warpage strength, research is being conducted on various types of structural design and modification and materials.

Accordingly, the present disclosure may prevent warpage cracks from occurring by causing peel-off in an external electrode structure, by applying a silver (Ag) coating layer structure to an external electrode band in which warpage stress is intensively applied.

The external electrodes 131 and 132 according to an example embodiment of the present disclosure may include silver (Ag) coating layers 131*b* and 132*b* disposed between the electrode layers 131*a* and 132*a* and the conductive resin layers 131*c* and 132*c* of the band portion.

In other words, the silver (Ag) coating layers 131*b* and 132*b* may be disposed in a band portion region of the external electrode. For example, with reference to FIG. 3, the silver (Ag) coating layers 131*b* and 132*b* may be disposed in a portion disposed below the extension line EL1 of the first surface in the first direction and above the extension line EL2 of the second surface in the first direction. More specifically, the silver (Ag) coating layers 131*b* and 132*b* may be disposed between the electrode layers 131*a* and 132*a* and the conductive resin layers 131*c* and 132*c* of the band portion, and may be disposed in a portion disposed below the extension line EL1 of the first surface in the first direction and above the extension line EL2 of the second surface in the first direction.

The silver (Ag) coating layers 131*b* and 132*b* may be disposed between the electrode layers 131*a* and 132*a* and the conductive resin layers 131*c* and 132*c* of the band portion, so that when warpage stress is applied, an occurrence of warpage cracks may be further suppressed by causing peel-off between the electrode layers 131*a* and 132*a* and the conductive resin layers 131*c* and 132*c*.

In this case, an average thickness of the silver (Ag) coating layers 131*b* and 132*b* may be 2 μm or more and 5 μm or less.

As the average thickness of the silver (Ag) coating layers 131*b* and 132*b* satisfies 2 μm or more and 5 μm or less, peel-off due to warpage stress may be more easily caused.

When the average thickness of the silver (Ag) coating layers 131*b* and 132*b* is less than 2 μm, peel-off may be partially caused, but there may be a risk of an occurrence of warpage cracks, and when the average thickness of the silver (Ag) coating layers 131*b* and 132*b* is more than 5 μm, there may be a risk that the adhesive force between the electrode layers 131*a* and 132*a* and the conductive resin layers 131*c* and 132*c* may decrease, thereby weakening the adhesion strength.

A method of measuring the average thickness of the silver (Ag) coating layers 131*b* and 132*b* may be obtained, for example, by measuring a thickness at various points of the silver (Ag) coating layers 131*b* and 132*b*, based on the first and second directional cross-sections of the multilayer electronic component 100 observed under the SEM. More specifically, after sizes (thickness) of a straight line in a direction, perpendicular to the electrode layers 131*a* and 132*a*, are measured at 10 points spaced apart from each other at equal intervals, a value obtained by averaging the sizes thereof may be referred to as an average thickness of the silver (Ag) coating layers 131*b* and 132*b*. Alternatively, the average thickness may refer to a value obtained by measuring and averaging first directional sizes at 10 points spaced apart from each other at equal intervals in a region of the silver (Ag) coating layers 131*b* and 132*b*, substantially parallel to the first and second surfaces 1 and 2 of the body, but the present disclosure is not particularly limited thereto. Other methods and/or tools appreciated by one of ordinary skill in the art, even if not described in the present disclosure, may also be used.

The silver (Ag) coating layers 131*b* and 132*b* according to an example embodiment of the present disclosure may not be disposed between the electrode layers 131*a* and 132*a* and the conductive resin layers 131*c* and 132*c* of the connection portion.

When the silver (Ag) coating layers 131*b* and 132*b* are disposed on the connection portion, peel-off may be more easily caused, but the adhesive force between the electrode layers 131*a* and 132*a* and the conductive resin layers 131*c* and 132*c* may be reduced, and thus, there is a risk that complete delamination may occur between the electrode layers 131*a* and 132*a* and the conductive resin layers 131*c* and 132*c*.

Meanwhile, an average atomic percentage of silver (Ag) in the silver (Ag) coating layers 131*b* and 132*b* may be 90 at % or more, and preferably 95 at % or more. When expressed as an average weight percentage (wt %), the average weight percentage of silver (Ag) may be 95 wt % or more, preferably 97 wt % or more, more preferably 98 wt % or more, and at individual points, there may be multiple points in which the average weight percentage (wt %) is more than 99 wt %.

The method of measuring the average atomic percentage (or average weight percentage) of silver (Ag) is not particularly limited, but based on the first and second directional cross-sections of the multilayer electronic component 100, when energy dispersive X-ray spectroscopy (EDS) was performed at 10 points in the center of the silver (Ag) coating layers 131*b* and 132*b*, the average atomic percentage (or average weight percentage) thereof may be an average value of the atomic percentage values (or weight percentage values) of silver (Ag) measured at the 10 points. Alternatively, the average atomic percentage (or average weight percentage) thereof may refer to a value of the atomic percentage (or the weight percentage) of silver (Ag) measured when EDS analysis of silver (Ag) is performed on an entire area of the silver (Ag) coating layers 131*b* and 132*b*. Other methods and/or tools appreciated by one of ordinary skill in the art, even if not described in the present disclosure, may also be used.

In other words, the silver (Ag) coating layers 131*b* and 132*b* correspond to pure silver (Ag) including little or no other conductive metal or alloy, or may be viewed as substantially pure silver (Ag).

The method of forming the silver (Ag) coating layer is not particularly limited, but may be formed by, for example, a galvanic substitution reaction.

More specifically, after completing the sintering of the electrode layers 131*a* and 132*a*, the electrode layers 131*a* and 132*a* are immersed in a silver (Ag) aqueous solution, for example, silver nitrate ($AgNO_3$) of 10 mM to 1 M (molarity, 1M=1 mol/L) for 10 to 60 minutes, to allow the silver (Ag) reduction reaction to occur, and then the immersed electrode layers 131*a* and 132*a* are washed with distilled water two to three times, and thus, excessively formed silver (Ag) reduction products or silver (Ag) ions may be removed to form a silver (Ag) (coating layer having a substantially constant thickness.

When immersed in an aqueous solution of silver nitrate ($AgNO_3$), a silver (Ag) coating layer may be formed by immersing only a band portion of the electrode layer. Alternatively, after immersing all portions of the electrode layer to form a silver (Ag) coating layer, the silver (Ag) coating layer formed at the connection portion may be removed to form an (Ag) coating layer only on an electrode layer of the band portion, but the present disclosure is not particularly limited thereto.

Then, a paste including a conductive metal and a resin may be applied or transferred onto the electrode layers 131*a* and 132*a* and the silver (Ag) coating layers 131*b* and 132*b* to form conductive resin layers 131*c* and 132*c*.

Meanwhile, a length of a region in which the silver (Ag) coating layer according to an example embodiment of the present disclosure is formed may be 50% or more of a length of the electrode layer of the band portion.

An upper limit of the length of the silver (Ag) coating layer for inducing peel-off is not particularly limited, but for adhesion strength between the electrode layers 131*a* and 132*a* and the conductive resin layers 131*c* and 132*c*, the upper limit of the silver (Ag) coating layer may be 80% or less, and preferably 70% or less.

In other words, the length of the region in which the silver (Ag) coating layer is formed may be more than 50% of a length of a boundary region between the electrode layer and the conductive resin layer of the band portion. More specifically, when the length of the electrode layers 131*a* and 132*a* of the band portion is referred to as IFL and the length of the silver (Ag) coating layers 131*b* and 132*b* is referred to as L, 50%≤L/IFL may be satisfied, or L/IFL≤80% may be satisfied.

For example, with reference to FIG. 5, here, the length (IFL) of the electrode layers 131*a* and 132*a* of the band portion may refer to a sum (L+L') of a length (L) of an interface between the electrode layers 131*a* and 132*a* of the band portion and the silver (Ag) coating layers 131*b* and 132*b* and a length (L', not shown) of an interface between the electrode layers 131*a* and 132*a* of the band portion and the conductive resin layers 131*c* and 132*c* of the band portion. A length (L) of the silver (Ag) coating layers 131*b* and 132*b* may refer to a length (L) of the interface between the electrode layers 131*a* and 132*a* of the band portion and the silver (Ag) coating layers 131*b* and 132*b*.

A ratio (L/IFL) of the length (L) of the silver (Ag) coating layers 131*b* and 132*b* to the length (IFL) of the electrode layers 131*a* and 132*a* of the band portion may satisfy 50%≤L/IFL, or may satisfy L/IFL≤80%, so that peel-off due to warpage stress may be more easily caused. On the other hand, when comparing the L/IFL value of 70% and 80%, there may be little difference in peel-off effect due to warpage stress.

When the ratio (L/IFL) of the length (L) of the silver (Ag) coating layers 131*b* and 132*b* to the length (IFL) of the electrode layers 131*a* and 132*a* of the band portion is less than 50% (L/IFL<50%), peel-off may be partially caused, but there is a risk of warpage cracks occurring, and when the ratio (L/IFL) of the length (L) of the silver (Ag) coating layers 131*b* and 132*b* to the length (IFL) of the electrode layers 131*a* and 132*a* of the band portion is more than 80% (80%<L/IFL), there may be a risk that the adhesive force between the electrode layers 131*a* and 132*a* and the conductive resin layers 131*c* and 132*c* may decrease, thereby weakening the adhesion strength.

The method of measuring the length (IFL) of the electrode layer of the band portion and the length (L) of the silver (Ag) coating layer is not particularly limited. For example, based on the first and second directional cross-sections of the multilayer electronic component, after capturing an image of a region of the band portion of the external electrode in which the silver (Ag) coating layer is disposed using a scanning electron microscope (SEM) at 2000× magnification, the length (IFL) of the electrode layer may be measured using a freehand line function of the Image J program. More specifically, the length (L) of the interface between the electrode layer of the band portion and the silver (Ag) coating layer, which is a section to be measured, by selecting the freehand line function, the length of the interface between the electrode layer of the band portion and the conductive numerical layer of the band portion may be measured, and a length of the electrode layer (IFL) of the band portion, which is the sum of L and L', may be obtained.

As an example of a more specific method of measuring the content of elements included in the silver (Ag) coating layers 131*b* and 132*b*, in the case of a destruction method, the components in the dielectric grains may be analyzed in the center of the chip using SEM-EDS, TEM-EDS, or STEM-EDS. First, a thinly sliced analysis sample is prepared using a Focused Ion Beam (FIB) device in a region including a dielectric microstructure among the cross sections of a sintered body. Then, a damaged layer on the surface of the thinned sample is removed using argon (Ar) ion milling, and then, qualitative/quantitative analysis is performed by mapping each component in the image obtained using SEM-EDS, TEM-EDS, or STEM-EDS. In this case, the qualitative/quantitative analysis graph of each component may be expressed in terms of weight percentage (wt %), atomic percentage (at %), or mole percentage (mol %) of each element.

In another method, a chip is pulverized to select the area including the dielectric microstructure, and in a portion including the selected dielectric microstructure, components of the region including the dielectric microstructure may be analyzed using devices such as an inductively coupled plasma spectrometer (ICP-OES) and an inductively coupled plasma mass spectrometer (ICP-MS). Other methods and/or tools appreciated by one of ordinary skill in the art, even if not described in the present disclosure, may also be used.

The plating layers 131*d*, 132*d*, 131*e* and 132*e* may serve to improve mounting characteristics.

The type of plating layers 131*d*, 132*d*, 131*e* and 132*e* is not particularly limited, and may be a single plating layer 131*d* or 132*d* including one or more of nickel (Ni), tin (Sn), palladium (Pd), and alloys thereof, or may be a plurality of plating layers 131*d*, 132*d*, 131*e* and 132*e*.

For a more specific example of the plating layers 131*d*, 132*d*, 131*e* and 132*e*, the plating layers 131*d*, 132*d*, 131*e* and 132*e* may be a Ni plating layer or a Sn plating layer, and may be in the form in which the Ni plating layer and the Sn plating layer are sequentially formed on the conductive resin layers 131*c* and 132*c*, and may be in the form in which the Sn plating layer, the Ni plating layer, and the Sn plating layer are formed sequentially. Additionally, the plating layers 131*d*, 132*d*, 131*e* and 132*e* may include a plurality of Ni plating layers and/or a plurality of Sn plating layers.

A size of the multilayer electronic component 100 is not particularly limited.

However, in order to achieve both miniaturization and high capacitance, the thickness of the dielectric layer and internal electrode need to be thinned to increase the number of stacks, and in order to improve dielectric breakdown voltage (BDV) characteristics under high voltage, the thickness of the dielectric layer and internal electrode need to be ensured to be constant, and in consideration of all characteristics such as mechanical strength according to warpage stress, an effect according to the present disclosure may be more remarkable in the multilayer electronic component 100 having a size of 3216 (length×width: 3.2 mm×1.6 mm) or less.

Hereinafter, the present disclosure will be described in more detail through examples, but these are intended to aid specific understanding of the invention and the scope of the present disclosure is not limited by the examples.

EXAMPLE

Examples 1 to 10 were manufactured in the following manner. After applying a copper (Cu) paste on a ceramic body and sintering the copper (Cu) paste to form an electrode layer, the electrode layer was immersed into a 0.1 mM to 0.1M aqueous solution of silver nitrate ($AgN0_3$) for 10 to 60 minutes to cause a silver (Ag) reduction reaction, and then the immersed electrode layer was washed with distilled water to remove excess silver (Ag) reduction product that falls off a surface thereof, thus forming a silver (Ag) coating layer on the ceramic body and electrode layer. Then, the silver (Ag) coating layer formed on end-surfaces of the first and third surfaces of the electrode layer was mounted on a carrier plate and removed using an adhesive tape. Then, a copper (Cu)-epoxy paste was applied on the electrode layer and the silver (Ag) coating layer and was sintered to form a conductive resin layer. Then, a nickel (Ni) plating layer and a tin (Sn) plating layer were formed on the conductive resin layer to complete a chip. The silver (Ag) coating layer was formed with various thicknesses and lengths depending on the molar concentration (M) and immersion time of a silver nitrate ($AgNO_3$) aqueous solution.

In Example 1, a chip was manufactured in the same process as described above, except that the electrode layer was immersed into a 0.1 M aqueous solution of silver nitrate ($AgN0_3$) for 30 minutes to cause a silver (Ag) reduction reaction, and then the immersed electrode layer was washed with distilled water to remove excess silver (Ag) reduction product that falls off a surface thereof, thus forming a silver (Ag) coating layer on the ceramic body and electrode layer. In this case, an average thickness of the silver (Ag) coating layer in the band portion was 3.4 μm, and the length (L) of the silver (Ag) coating layer to the length (IFL) of the electrode layer in the band portion was about 82%.

Figure 6:
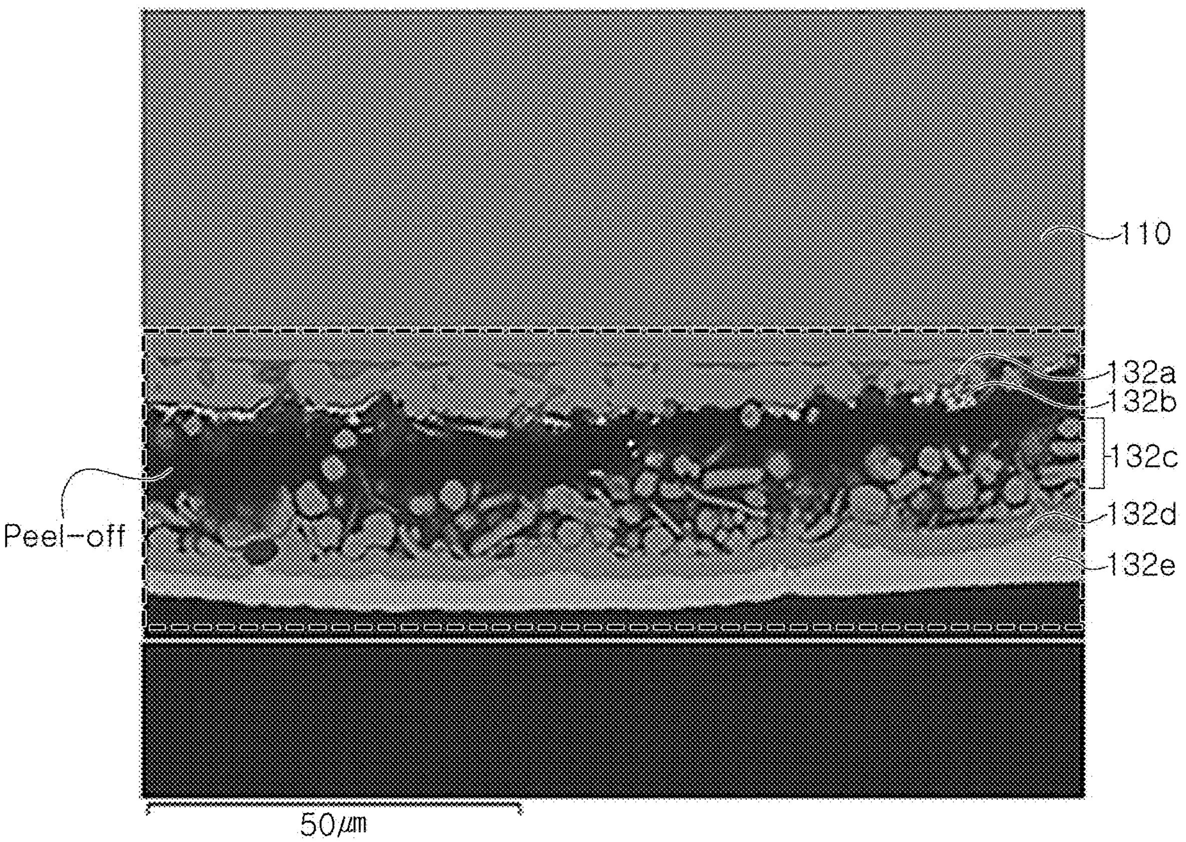
FIG. 6 is an image, captured by SEM, of one region of an external electrode according to an example embodiment of the present disclosure.

When described with reference to FIGS. 6 and 7, which are images of the scanning electron microscope (SEM) and EDS analysis for Example 1 of the present disclosure, for a warpage strength test, warpage stress of 10 mm was applied to the chip for a harsh limit evaluation above a guarantee level, and then, when a region between the electrode layer of the band portion and the conductive resin layer was observed with a scanning electron microscope (SEM) at 2000× magnification, it may be confirmed that peel-off occurred. Furthermore, when the SEM-EDS analysis was performed on a dot-and-dashed line region in FIG. 6, which is the region of the band portion, when observing regions in which copper (Cu), silver (Ag), nickel (Ni) and tin (Sn) were detected, it may be confirmed that peel-off occurred along the silver (Ag) coating layer between the electrode layer and the conductive resin layer of the band portion.

Next, Table 1 reflects the evaluation of warpage cracks, peel-off, and adhesion strength according to an average thickness of the silver (Ag) coating layer for each example.

Example 2 is an example in which an electrode layer was formed on a ceramic body, a conductive resin layer was formed on the electrode layer, and a silver (Ag) coating layer was not formed. A chip was manufactured in the same process as Example 1, except for the process of forming a silver (Ag) coating layer.

In Examples 3 to 5, a chip was produced in the same manner as Example 1 except that the average thickness of the silver (Ag) coating layer was manufactured differently by varying the immersion time in silver nitrate ($AgNO_3$). More specifically, the average thickness of the silver (Ag) coating layer in each chip of Example 3 was less than 2 μm, and the average thickness of the silver (Ag) coating layer in each chip of Example 4 was 2 μm or more and 5 μm or less, and the average thickness of the silver (Ag) coating layer in each chip of Example 5 was more than 5 μm.

In a warpage strength evaluation, after manufacturing 20 chips for each example, the 20 chips were mounted on a warpage strength (piezo type) substrate (1.6 T according to the AEC-Q200 evaluation rule) to a limit evaluation exceeding the scope of assurance, and then, all 20 chips were removed from the board, and first and second directional cross-sections of each chip were confirmed to count and reflect the number of chips in which warpage cracks and peel-off occurred.

Here, the warpage strength (piezo method) evaluation method may be as follows. First, five sample chips were mounted on a piezo PCB, and to develop piezoelectric properties, a DC-bias was applied to the chip to generate a potential difference, and then bending is applied. A potential difference occurred due to external force caused by bending, and a microcurrent generated due to changes in potential difference may be measured and expressed in a graph, and the graph expressed in this case is referred to as a piezo graph, which is a method of evaluating whether defects occur and a point of occurrence by interpreting the piezo graph.

In an adhesion strength evaluation, when a stress of 18 N was applied to the first and second direction end-surfaces of the chip for 60 seconds according to the AEC-Q200 standard, if a capacitance change of more than 10% occurred or the chip was detached, this was determined to be defective, and the number of defective chips was counted and reflected in Table 1.

After evaluating warpage strength and adhesion strength, during evaluating adhesion strength, if even one chip was defective, this was determined to be X, and even if there were no chips with defects in the adhesion strength, when any of the 20 chips had warpage cracks, or all the 20 chips did not have a peel-off, this was determined to be a triangle (Δ), and in all 20 chips, when the peel-off occurred without an occurrence of adhesion strength defect or warpage cracks, this was determined to be a circle (○).

TABLE 1

| Example | Warpage Crack | Peel-off | Adhesion Strength | Determination |
|---|---|---|---|---|
| Example 2 | 5/20 | 5/20 | 0/20 | Δ |
| Example 3 | 3/20 | 10/20 | 0/20 | Δ |
| Example 4 | 0/20 | 20/20 | 0/20 | ○ |
| Example 5 | 0/20 | 20/20 | 2/20 | X |

In Example 2, as the silver (Ag) coating layer was not formed, warpage cracks occurred in 5 out of 20 chips due to warpage stress, and the peel-off occurred in five chips, and no chips with defective adhesion strength occurred. In Example 2, which is the same case as a conventional chip in which no silver (Ag) coating layer is formed, the adhesion strength between the electrode layer and the conductive resin layer was satisfactory, but since no peel-off occurred, this was determined to be an occurrence of warpage cracks.

In Example 3, as the average thickness of the silver (Ag) coating layer was formed to be less than 2 μm, warpage cracks occurred in 3 out of 20 chips due to warpage stress, and peel-off occurred in 10 chips, and no chips with defective adhesion strength occurred. As warpage cracks occurred in chips in which no peel-off occurred, it was determined that the silver (Ag) coating layer was not properly formed.

In Example 4, as the average thickness of the silver (Ag) coating layer was formed at 2 μm or more and 5 μm or less, none of the 20 chips developed warpage cracks or had defective adhesion strength due to warpage stress, and peel-off occurred in 20 chips. As the silver (Ag) coating layer was properly formed, this was determined to have shown excellent results in all warpage crack, peel-off, and adhesion strength evaluations.

In Example 5, as the average thickness of the silver (Ag) coating layer is formed to exceed 5 μm, due to warpage stress, none of the 20 chips developed warpage cracks, and peel-off occurred in 20 chips, but there were two chips with defective adhesion strength. Due to the excessive formation of the silver (Ag) coating layer, the adhesive force between the electrode layer and the conductive numerical layer was determined to be weakened.

Next, Table 2 shows that warpage cracks, peel-off, and adhesion strength are evaluated and reflected by changing a ratio (L/IFL) according to the length (L) of the silver (Ag) coating layer to the length (IFL) of the electrode layer of the band portion for each example.

Example 6 is an example in which an electrode layer is formed on a ceramic body, and a conductive resin layer is formed on the electrode layer, and a silver (Ag) coating layer was not formed. A chip was manufactured in the same process as Example 1, except for the process of forming the silver (Ag) coating layer.

In Examples 7 to 10, a chip was manufactured in the same manner as Example 1 except that a length of the silver (Ag) coating layer was manufactured differently by varying the immersion time in silver nitrate ($AgNO_3$). More specifically, L/IFL in each chip of Example 7 was about 30% (±5% error), L/IFL of the silver (Ag) coating layer in each chip of Example 8 was about 50% (±5% error), L/IFL of the silver (Ag) coating layer in each chip of Example 9 was about 70% (±5% error), and L/IFL of the silver (Ag) coating layer in each chip of Example 10 was more than 85%.

Warpage strength and bonding strength evaluation were conducted in the same manner as in Table 1.

After evaluating the warpage and strength and adhesion strength, when even one chip was defective during the adhesion strength evaluation, this was determined to be X, and even if there were no chips with defects in adhesion strength, when any of the 20 chips had warpage cracks, or all the 20 chips did not have a peel-off, this was determined to be a triangle (Δ), and in all 20 chips, when the peel-off occurred without an occurrence of adhesion strength defect or warpage cracks, this was determined to be a circle (○).

TABLE 2

| Example | Warpage Crack | Peel-off | Adhesion Strength | Determination |
|---|---|---|---|---|
| Example 6 | 5/20 | 5/20 | 0/20 | Δ |
| Example 7 | 3/20 | 15/20 | 0/20 | Δ |
| Example 8 | 0/20 | 20/20 | 0/20 | ○ |
| Example 9 | 0/20 | 20/20 | 2/20 | ○ |
| Example 10 | 0/20 | 20/20 | 2/20 | X |

In Example 6, as the silver (Ag) coating layer was not formed, due to warpage stress, warpage cracks occurred in 5 out of 20 chips, and peel-off occurred in five chips, and no chips with defective adhesion strength occurred. In Example 6, which is the same case as a conventional chip in which a silver (Ag) coating layer is not formed, the adhesion strength between the electrode layer and the conductive resin layer was satisfactory, but since no peel-off occurred, this was determined to be an occurrence of warpage cracks.

In Example 7, as the L/IFL of the chip was formed to be about 30% (±5% error), due to warpage stress, warpage cracks occurred in 3 out of 20 chips, and peel-off occurred in 15 chips, and no chips with defective adhesion strength occurred. Considering that warpage cracks occurred in the chips that no peel-off occurred, it was determined that the silver (Ag) coating layer was not properly formed.

In Example 8, as the L/IFL of the chip was formed to be about 50% (±5% error), among the 20 chips, there were no warpage cracks or defective bonding strength due to warpage stress, and peel-off occurred in the 20 chips. As the silver (Ag) coating layer was properly formed, excellent results were determined to be shown in all warpage cracks, peel-off, and adhesion strength evaluations.

In Example 9, as the L/IFL of the chip was formed to be about 70% (±5% error), among the 20 chips, there were no warpage cracks or defective bonding strength due to defective stress, and peel-off occurred in 20 chips. As the silver (Ag) coating layer was properly formed, excellent results were determined to be shown in all bending cracks, peel-off, and adhesion strength evaluations.

In Example 10, as the L/IFL of the chip was formed to exceed 85%, none of the 20 chips developed warpage cracks due to warpage stress, and peel-off occurred in the 20 chips, but there were two chips with defective adhesion strength. Due to excessive formation of the silver (Ag) coating layer, the adhesive force between the electrode layer and the conductive numerical layer was determined to be weakened.

Although the example embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe an example embodiment, and are not intended to limit the present disclosure. Singular forms may include plural forms as well unless the context clearly indicates otherwise.

What is claimed is:

1. A multilayer electronic component, comprising:

a body including a dielectric layer, and internal electrodes alternately disposed with the dielectric layer in a first direction, the body comprising first and second surfaces opposing each other in the first direction, third and fourth surfaces opposing each other in a second direction and connected to the first and second surfaces, and fifth and sixth surfaces opposing each other in a third direction and connected to the first to fourth surfaces; and an external electrode including a connection portion disposed on the third and fourth surfaces, and a band portion extending from the connection portion to a portion of the first and second surfaces, wherein the external electrode comprises an electrode layer connected to the internal electrodes and including a first conductive metal and glass, a conductive resin layer disposed on the electrode layer and including a second conductive metal and a resin, and a silver (Ag) coating layer disposed in the band portion and between the electrode layer and the conductive resin layer, and an average thickness of the silver (Ag) coating layer is 2 μm or more and 5 μm or less.

2. The multilayer electronic component according to claim 1, wherein the silver (Ag) coating layer is not disposed in the connection portion.

3. The multilayer electronic component according to claim 1, wherein the silver (Ag) coating layer has an average atomic percentage of silver (Ag) of 90 at % or more.

4. The multilayer electronic component according to claim 1, wherein the silver (Ag) coating layer has an average weight percentage of silver (Ag) of 95 wt % or more.

5. The multilayer electronic component according to claim 1, wherein, when a length of the electrode layer of the band portion is referred to IFL and a length of the silver (Ag) coating layer is referred to L, 50%≤L/IFL is satisfied.

6. The multilayer electronic component according to claim 5, wherein L/IFL≤80% is satisfied.

7. The multilayer electronic component according to claim 1, wherein the first and second conductive metals are the same metal.

8. The multilayer electronic component according to claim 7, wherein the first and second conductive metals are copper (Cu).

9. The multilayer electronic component according to claim 1, wherein the external electrode further comprises a plating layer disposed on the conductive resin layer.

10. A multilayer electronic component, comprising:

a body including a dielectric layer, and internal electrodes alternately disposed with the dielectric layer in a first direction, the body comprising first and second surfaces opposing each other in the first direction, third and fourth surfaces opposing each other in a second direction and connected to the first and second surfaces, and fifth and sixth surfaces opposing each other in a third direction and connected to the first to fourth surfaces; and an external electrode including a connection portion disposed on the third and fourth surfaces, and a band portion extending from the connection portion to a portion of the first and second surfaces, wherein the external electrode comprises an electrode layer connected to the internal electrodes and including a first conductive metal and glass, a conductive resin layer disposed on the electrode layer and including a second conductive metal and a resin, and a silver (Ag) coating layer disposed in the band portion and between the electrode layer and the conductive resin layer, and the silver (Ag) coating layer has an average atomic percentage of silver (Ag) of 90 at % or more.

11. The multilayer electronic component according to claim 10, wherein the silver (Ag) coating layer is not disposed in the connection portion.

12. The multilayer electronic component according to claim 10, wherein, when a length of the electrode layer of the band portion is referred to IFL and a length of the silver (Ag) coating layer is referred to as L, 50%≤L/IFL is satisfied.

13. The multilayer electronic component according to claim 12, wherein L/IFL≤80% is satisfied.

14. The multilayer electronic component according to claim 13, wherein the silver (Ag) coating layer is disposed only in the band portion.

15. The multilayer electronic component according to claim 14, wherein an average thickness of the silver (Ag) coating layer is 2 μm or more and 5 μm or less.

16. The multilayer electronic component according to claim 15, wherein the silver (Ag) coating layer includes a plurality of silver islands that are spaced apart from each other.

17. The multilayer electronic component according to claim 10, wherein the first and second conductive metals are the same metal.

18. The multilayer electronic component according to claim 17, wherein the first and second conductive metals are copper (Cu).

19. The multilayer electronic component according to claim 10, wherein the external electrode further comprises a plating layer disposed on the conductive resin layer.

* * * * *